(12) United States Patent
Levine

(10) Patent No.: US 6,390,508 B2
(45) Date of Patent: *May 21, 2002

(54) METHOD OF PRODUCING A CUSTOMIZED CHART

(76) Inventor: Matthew Levine, 7040 NW. 68th Dr., Parkland, FL (US) 33067

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/219,676
(22) Filed: Dec. 23, 1998

Related U.S. Application Data
(60) Provisional application No. 60/070,134, filed on Dec. 31, 1997.

(51) Int. Cl.$^7$ ............................................. B42D 15/00
(52) U.S. Cl. ........................ 283/115; 283/34; 345/440; 346/62
(58) Field of Search ........................ 346/62, 121, 123; 283/65, 115, 34, 35; 345/440

(56) References Cited

U.S. PATENT DOCUMENTS

| | | | | |
|---|---|---|---|---|
| 3,103,402 A | * | 9/1963 | Stoops | |
| 3,552,621 A | * | 1/1971 | Kupfershmidt | 226/174 |
| 3,673,608 A | * | 6/1972 | Voorman, Jr. | 346/18 |
| 3,752,917 A | * | 8/1973 | Foley et al. | 315/22 |
| 3,761,873 A | * | 9/1973 | Hopkin | 340/3 R |
| 3,914,773 A | * | 10/1975 | Harrower | 346/121 |
| 4,083,052 A | * | 4/1978 | Mtcalf | 346/18 |
| 4,213,135 A | * | 7/1980 | Medvecky | 346/136 |
| 4,214,250 A | * | 7/1980 | Fujita et al. | 346/145 |
| 4,430,657 A | * | 2/1984 | Scott et al. | 346/32 |
| 4,560,995 A | * | 12/1985 | Suga et al. | 346/136 |
| 4,733,248 A | * | 3/1988 | Hibino | 346/33 R |
| 4,751,526 A | * | 6/1988 | Tohara | 346/139 R |
| 4,837,709 A | * | 6/1989 | Sasaki | 364/519 |
| 4,884,440 A | * | 12/1989 | Berthel | 73/171 |
| 4,951,681 A | * | 8/1990 | Mortara | 128/710 |
| 4,977,409 A | * | 12/1990 | Kanda | 346/23 |
| 5,019,838 A | * | 5/1991 | Mc Kinley et al. | 346/121 |
| 5,146,550 A | * | 9/1992 | Furter et al. | 395/140 |
| 5,216,439 A | * | 6/1993 | Mc Cormack et al. | 346/65 |
| 5,264,864 A | * | 11/1993 | Hollman et al. | 346/1.1 |
| 5,442,188 A | * | 8/1995 | Brimbal et al. | 250/566 |
| 5,684,508 A | * | 11/1997 | Brilman | 345/134 |
| 5,982,383 A | * | 11/1999 | Kumar et al. | 345/440 |

* cited by examiner

Primary Examiner—A. L. Wellington
Assistant Examiner—Monica Carter
(74) Attorney, Agent, or Firm—Gifford, Krass, Groh, Sprinkle, Anderson & Citkowski, PC

(57) ABSTRACT

As part of a method of producing a customized chart for use with chart recorder apparatus, a user desiring the customized chart is provided with a list of questions including, for example, the size of the chart; the graduations of the chart with respect to a first chart dimension; and the graduations of the chart with respect to a second chart dimension. The questions are input to a software applications program operative to generate a datafile containing a graphical representation of the desired chart based upon the answers received. The datafile is delivered to a printing facility, where the chart is physically produced in accordance with the data file, then delivered to the user. One or more of the steps associated with the method may be carried out over a remote communications link such as a telephone to enhance convenience. For example, the step of inputting the answers may take place over a communications link from a remote location using phone lines and voice, modem or Internet protocols. Likewise, the step of delivering the datafile to a printing facility may similarly occur over a communications link in electronic form. In the case of a circular chart, the list of questions might specifically include the diameter of the chart; the direction of rotation of the chart; the speed of rotation of the chart; the radial graduations of the chart; and the time graduations of the chart. The list of questions may further be altered in accordance with the end application.

15 Claims, 3 Drawing Sheets

Questions to be answered ...

1) What is the center of the chart's HOLE diameter?
2) What is the diameter of the INNER-MOST graduation?
3) What is the diameter of the OUTER-MOST graduation?
4) What is the pen arm length?
5) What is the rotation speed of the chart (1 hr, 8 hrs, 12 hrs, 24 hrs, 7 days, 14 days, 28 days, 30 days, 31 days)?
6) Chart rotation direction (clockwise / counter-clockwise)?
7) What is the total number of graduations?
8) Enter graduation number and its label ...
9) Total number of graduation label sets?
10) Enter number of graduation that is of MEDIUM line thickness ...
11) What is the total number of TIME LINES?
12) Line thickness of a MAJOR graduation or TIME-LINE?
13) Line thickness of a MEDIUM graduation or TIME-LINE?
14) Line thickness of a MINOR graduation or TIME-LINE?
15) Number of TIME-LINES between a MAJOR and MEDIUM width TIME-LINE?
16) Number of TIME-LINES between two MAJOR width TIME-LINES?
17) What is the radius for "RADIUS #1" text/graphic?
18) What is the radius for "RADIUS #2" text/graphic?
19) What is the radius for "RADIUS #3" text/graphic?
20) What is the radius for "RADIUS #4" text/graphic?
21) Enter the text/graphic for RADIUS #1
22) Enter the text/graphic for RADIUS #2
23) Enter the text/graphic for RADIUS #3
24) Enter the text/graphic for RADIUS #4
25) Enter the TEXT SIZE for RADIUS #1
26) Enter the TEXT SIZE for RADIUS #2
27) Enter the TEXT SIZE for RADIUS #3

FIGURE 1

METHOD OF PRODUCING A CUSTOMIZED CHART

REFERENCE TO RELATED APPLICATION

This application claims priority of U.S. provisional application Ser. No. 60/070,134, filed Dec. 31, 1997, the entire contents of which are incorporated herein by reference.

FIELD OF THE INVENTION

This invention relates generally to chart recorders of the type used to monitor temperature, humidity, and so forth in environmentally conscience situations and, in particular, to a method whereby the customization of recorder paper for such chart recording systems may be automated as compared to prior-art techniques.

BACKGROUND OF THE INVENTION

At the present time, to keep costs down, paper for chart recorders, both circular and linear, are produced in large quantities, and are therefore not readily subject to customization. To provide a custom chart, a user typically produces a drawing, or the chart maker produces a drawing based upon user inputs, which is then formalized in camera-ready form and reproduced, again, in large quantities.

SUMMARY OF THE INVENTION

The subject invention resides in a method of producing a customized chart for use with chart recorder apparatus, as well as the charts produced according to the method, which may be circular charts, strip charts, or other geometric forms. According to the method, a user desiring the customized chart is provided with a list of questions including, for example:

a) the size of the chart, b) the graduations of the chart with respect to a first chart dimension, and c) the graduations of the chart with respect to a second chart dimension.

The questions are input to a software applications program operative to generate a datafile containing a graphical representation of the desired chart based upon the answers received. The datafile is delivered to a printing facility, where the chart is physically produced in accordance with the data file, then delivered to the user.

One or more of the steps associated with the method may be carried out over a remote communications link such as a telephone to enhance convenience. For example, the step of inputting the answers may take place over a communications link from a remote location using phone lines and voice, modem or Internet protocols. Likewise, the step of delivering the datafile to a printing facility may similarly occur over a communications link in electronic form.

In the case of a circular chart, a method of producing a customized circular chart according to the invention would preferably include the steps of providing a list of questions to a user desiring the customized chart, the list of questions at least including:

a) the diameter of the chart, b) the direction of rotation of the chart, c) the speed of rotation of the chart, d) the radial graduations of the chart, and e) the time graduations of the chart.

The list of questions may, of course, be altered in accordance with the end application, and may include a question regarding pen length, hole diameter, types of graduations, thickness of lines, and so forth as disclosed herein.

BRIEF DESCRIPTION OF DRAWINGS

FIG. 1 shows a table listing a set of preferred questions directed to a customer in need of a new or customized chart;

DETAILED DESCRIPTION OF THE INVENTION

This invention resides in an improved method of realizing a new chart, for a chart-recorder apparatus, which alleviates the need to actually produce a camera-ready of the chart before production. In the preferred embodiment, the potential customer communicates to the chart manufacturer, either by voice, or through electronic means, geometrical information about the chart, such as outer radius, inner radius, monitoring range, and so forth. Preferably, a plurality of questions are asked as shown in FIG. 1, and the responses are input as graphical information which is then transferred to a printer for automated chart generation.

Figure 2:
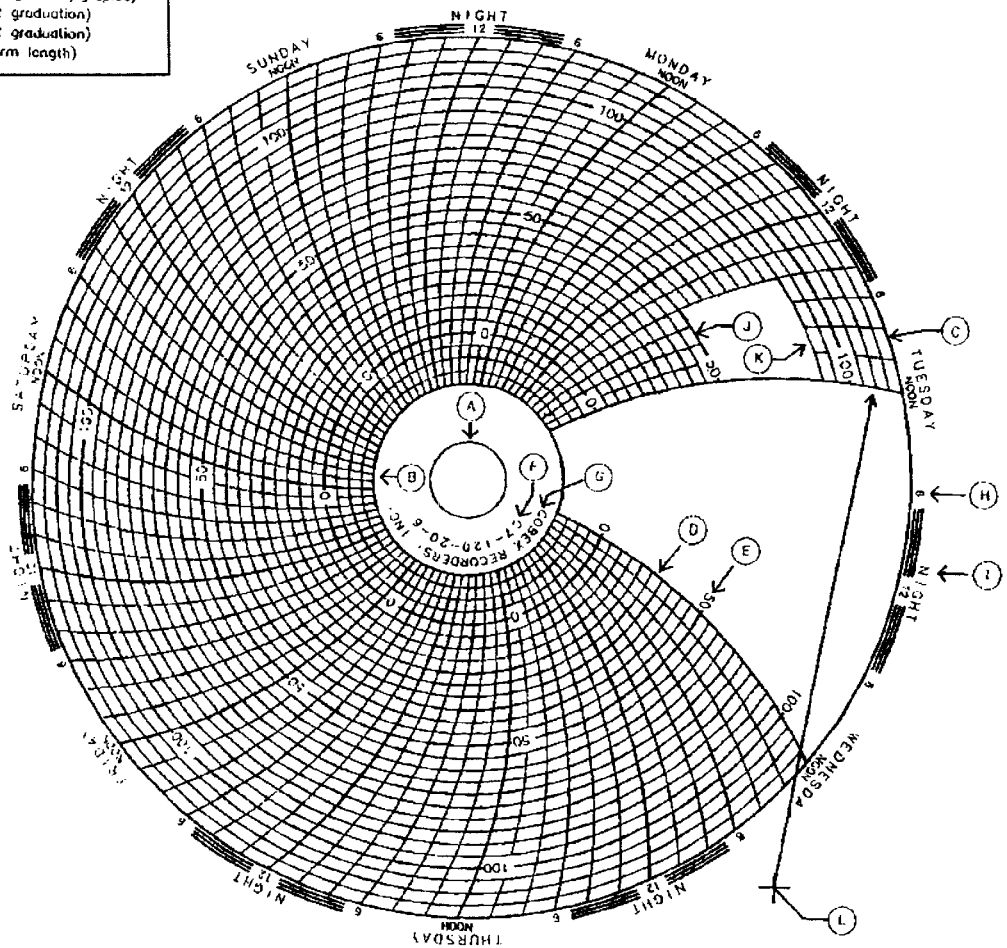
FIG. 2 is a drawing of a circular chart used for definitional purposes in accordance with the teachings of this invention.

In addition to the geometrical or physical information used to make this chart shown in FIG. 2, the customer also conveys the range within which a full-scale recording should be made, and this information is coupled to the physical information to ensure that the resulting chart includes the right range, for example, from inner radius to outer radius, for a particular application.

Figure 3:
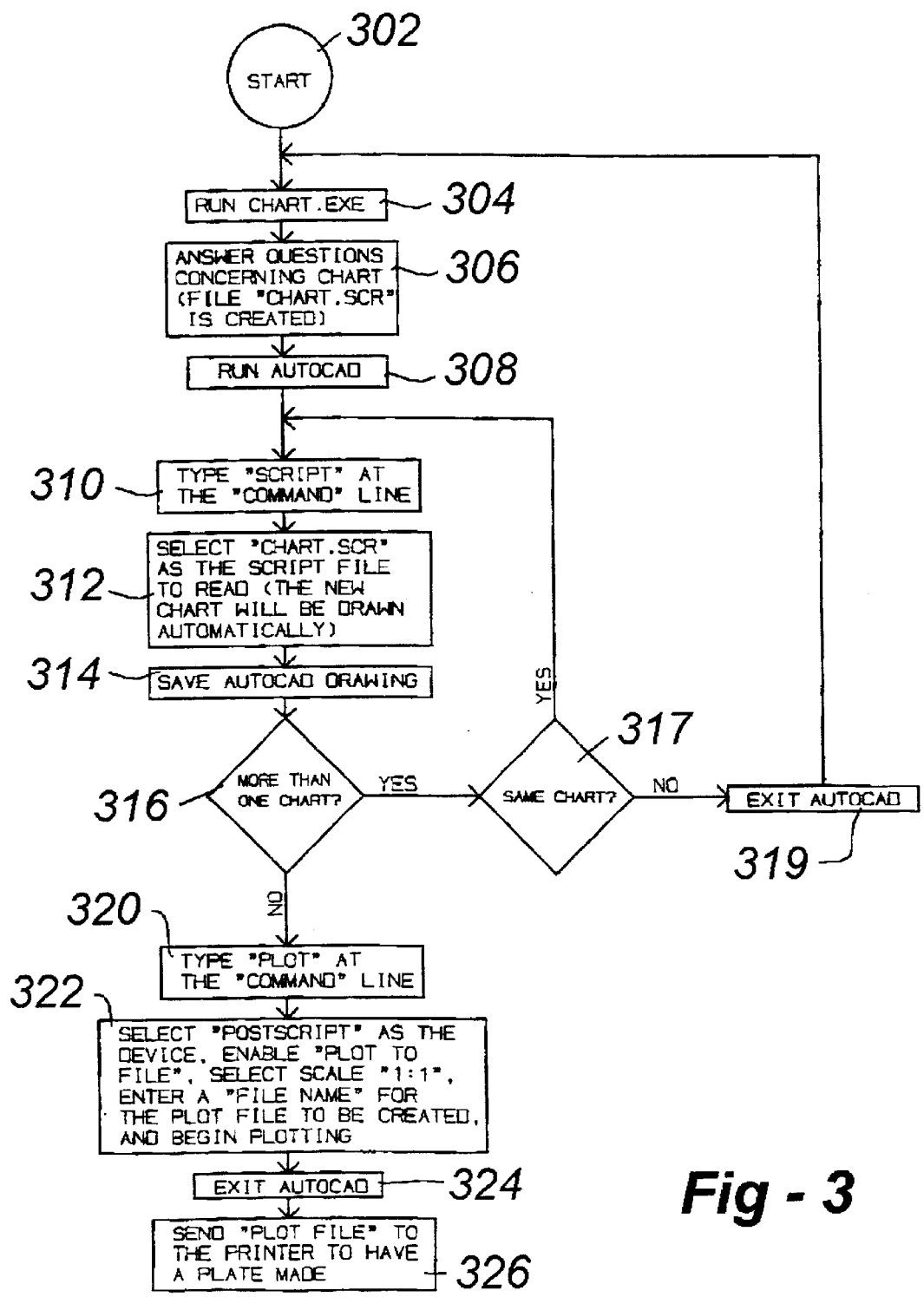
FIG. 3 is a flowchart used to illustrate major steps according to a method aspect of the invention.

Now making specific reference to the figures, FIG. 1 is a table which sets forth a list of questions that are preferably asked to a person or entity in need of a new or improved chart, certain of the questions being better understood with reference to FIG. 2, which gives definitions of chart aspects, at least with respect to a circular format. FIG. 3 is a flow diagram which shows the sequence of operations taken to input the questions and generate a database from which the chart in custom form may be finally rendered.

As shown in FIG. 1, the questions asked preferably have to do with physical dimensions and relationships associated with the desired chart, including whole diameter, radii, pen length, and so forth. The list of FIG. 1 is not meant to be exhaustive or limiting, but rather, is meant to be representative of the types of questions that would be asked in relation to creating a chart such as that shown in FIG. 2.

It will be appreciated by one of skill in the art, that certain questions would not be asked depending upon the type of chart desired, and that additional questions might be necessary for a more complex final product. For example, for use with a strip-chart recorder, questions as to whole diameter or radii might not be appropriate, whereas for a chart based upon a longer or shorter time period, questions regarding different time periods might be asked. Similarly, with respect to the chart's specific intended function, be it for temperature, humidity, vibration, and so forth, custom questions may be asked with regard to these attributes as well.

As shown in FIG. 3, the system begins at block 302, and begins to execute a software program entitled CHART.EXE at 304, after which questions concerning a desired chart are asked. For the purposes of this illustration, the questions shown in FIG. 1 are asked to generate the chart shown in FIG. 2. Block 308, a computer-aided-design program is accessed or launched to input data according to the answers to the questions input at block 306. Although the commercially available "AUTOCAD" is used as an example, it will be appreciated that any type of graphics package may alternative be used so long as it is suitable to the teachings described herein. At block 310 a script is added to the command line, and at block 312 the chart is drawn automatically based upon the generated data file. The drawing is saved at 314, and if new charts are not required, flow proceeds to blocks 320 and 322, wherein file names and other commands are entered, after which the drawing package is exited (324). At 326, a "PLOT FILE" is sent to a printer to generate a plate to physically reduce the desired chart.

At block 316, if more than one chart is desired, flow proceeds to block 317 where the question is asked whether the new chart is, in fact, the same chart as entered previously. If so, control is directed to block 310. If not, the drawing package is exited at 319, and flow is directed to block 304 wherein, essentially, the system awaits further input from a user.

Having described my invention, I claim:

1. A method of producing a customized chart for use with chart recorder apparatus, comprising the steps of:
    developing a list of questions regarding the physical characteristics of a chart to be produced, the list of questions at least including:
        a) the size of the chart,
        b) the graduations of the chart with respect to a first chart dimension, and
        c) the graduations of the chart with respect to a second chart dimension;
    displaying the list of questions on a computer screen to a user desiring a customer chart;
    receiving answers to the questions from the user and loading the answer into a software applications program operative to generate a datafile containing a graphical representation of the desired chart based upon the answers received;
    delivering the datafile to a printing facility;
    printing the chart at the printing facility in accordance with the data file;
    delivering the printed chart to the user without the user ever having to draw the physical characteristics; and
    placing the printed chart into the chart recorder apparatus to be recorded thereon.

2. The method of claim 1, wherein the chart is a circular chart, and wherein the list of questions includes a question regarding the chart diameter.

3. The method of claim 1, wherein the chart is a circular chart, and wherein the list of questions includes a question regarding the direction of chart rotation.

4. The method of claim 1, wherein the chart is a circular chart, and wherein the list of questions includes a question regarding the speed of chart rotation.

5. The method of claim 1, wherein the second chart dimension is time.

6. The method of claim 1, wherein the list of questions includes a question regarding pen length.

7. The method of claim 1, wherein the step associated with inputting the answers occurs over a communications link from a remote location.

8. The method of claim 1, wherein the step of delivering the datafile to a printing facility occurs over a communications link in electronic form.

9. A chart produced according to claim 1.

10. A method of producing a customized circular chart for use with circular chart recorder, comprising the steps of:
    developing a list of questions regarding the physical characteristics of a chart to be produced, the list of questions at least including:
        a) the diameter of the chart,
        b) the direction of rotation of the chart,
        c) the speed of rotation of the chart,
        d) the radial graduations of the chart, and
        e) the time graduations of the chart;
    displaying the list of questions on a computer screen to a user desiring a customer chart;
    receiving answers to the questions from the user and loading the answer into a software applications program operative to generate a datafile containing a graphical representation of the desired chart based upon the answers received;
    delivering the datafile to a printing facility;
    printing the chart at the printing facility in accordance with the data file without the user ever having to draw the physical characteristics; and
    delivering the printed chart to the user.

11. The method of claim 10, wherein the list of questions includes a question regarding pen length.

12. The method of claim 10, wherein the list of questions includes a question regarding hole diameter.

13. The method of claim 10, wherein the step associated with inputting the answers occurs over a communications link from a remote location.

14. The method of claim 10, wherein the step of delivering the datafile to a printing facility occurs over a communications link in electronic form.

15. A chart produced according to claim 10.

* * * * *